US011953058B2

(12) United States Patent
Duch

(10) Patent No.: US 11,953,058 B2
(45) Date of Patent: Apr. 9, 2024

(54) SEALING DEVICE FOR A BEARING UNIT

(71) Applicant: AKTIEBOLAGET SKF, Gothenburg (SE)

(72) Inventor: Daniele Duch, San Gillio (IT)

(73) Assignee: AKTIEBOLAGET SKF (SE)

( * ) Notice: Subject to any disclaimer, the term of this patent is extended or adjusted under 35 U.S.C. 154(b) by 0 days.

(21) Appl. No.: 17/749,441

(22) Filed: May 20, 2022

(65) Prior Publication Data

US 2022/0381293 A1 Dec. 1, 2022

(30) Foreign Application Priority Data

May 31, 2021 (IT) .......................... 102021000014144

(51) Int. Cl.
*F16C 33/80* (2006.01)
*B60B 27/00* (2006.01)
*F16C 33/78* (2006.01)

(52) U.S. Cl.
CPC ........ *F16C 33/805* (2013.01); *B60B 27/0073* (2013.01); *F16C 33/7823* (2013.01); *F16C 33/7886* (2013.01); *F16C 2326/02* (2013.01)

(58) Field of Classification Search
CPC .. F16C 33/7823; F16C 33/7886; F16C 33/80; F16C 33/805; F16C 2326/02; B60B 27/0073; F16J 15/3264; F16J 15/447
See application file for complete search history.

(56) References Cited

U.S. PATENT DOCUMENTS

| 9,855,793 | B2 | 1/2018 | Lim et al. |
| 2013/0127119 | A1* | 5/2013 | Haepp ................ F16C 33/7889 277/572 |
| 2016/0221391 | A1* | 8/2016 | Lim .................... F16J 15/3264 |
| 2017/0198748 | A1* | 7/2017 | Seo .................... B60B 27/0094 |
| 2017/0335890 | A1* | 11/2017 | Harada ............... F16C 33/7863 |
| 2018/0186181 | A1* | 7/2018 | Tada ................... F16C 19/186 |

(Continued)

FOREIGN PATENT DOCUMENTS

| CN | 112228459 | 1/2021 |
| DE | 102017205555 | 10/2017 |

(Continued)

OTHER PUBLICATIONS

Search Report for corresponding Italy Patent Application No. 202100014144 dated Jan. 26, 2022.

*Primary Examiner* — Alan B Waits
(74) *Attorney, Agent, or Firm* — Reed Smith LLP

(57) ABSTRACT

A sealing device for sealing off external contaminants from a bearing unit between a stationary radially outer ring and a rotatable radially inner ring, the sealing device including a first, metallic and rotatable annular screen having a first mounting area for assembly with interference on the radially inner ring, a second, metallic and stationary annular screen having a second mounting area for assembly with interference on the radially outer ring, an annular sealing element made of elastomeric material, integrally supported by the second annular screen, and equipped with at least one contacting annular sealing lip projecting axially and radially from the second screen towards the first screen, and a non-contacting annular lip extending axially and facing a first flange portion of the first annular screen.

11 Claims, 2 Drawing Sheets

(56) References Cited

U.S. PATENT DOCUMENTS

2019/0211876 A1* 7/2019 Lim .................. F16C 33/7883
2020/0224716 A1* 7/2020 Kitagawa ............ F16C 33/7883
2020/0292001 A1   9/2020 Jemoto et al.

FOREIGN PATENT DOCUMENTS

DE    102010064672    10/2019
KR     20160094176     8/2016

* cited by examiner

US 11,953,058 B2

SEALING DEVICE FOR A BEARING UNIT

CROSS-REFERENCE TO RELATED APPLICATIONS

This application is based on and claims priority to Italian Patent Application No. 102021000014144 filed on May 31, 2021, under 35 U.S.C. § 119, the disclosure of which is incorporated by reference herein.

BACKGROUND

In bearing units, sealing devices are used to prevent dirt, dust, and other external contaminants from entering the bearing unit, causing damage and decreasing the working life of the bearing unit.

BRIEF DESCRIPTION OF THE DRAWINGS

The disclosure will now be described with reference to the accompanying drawings which illustrate non-limiting exemplary embodiments thereof, in which.

DETAILED DESCRIPTION

Figure 1:
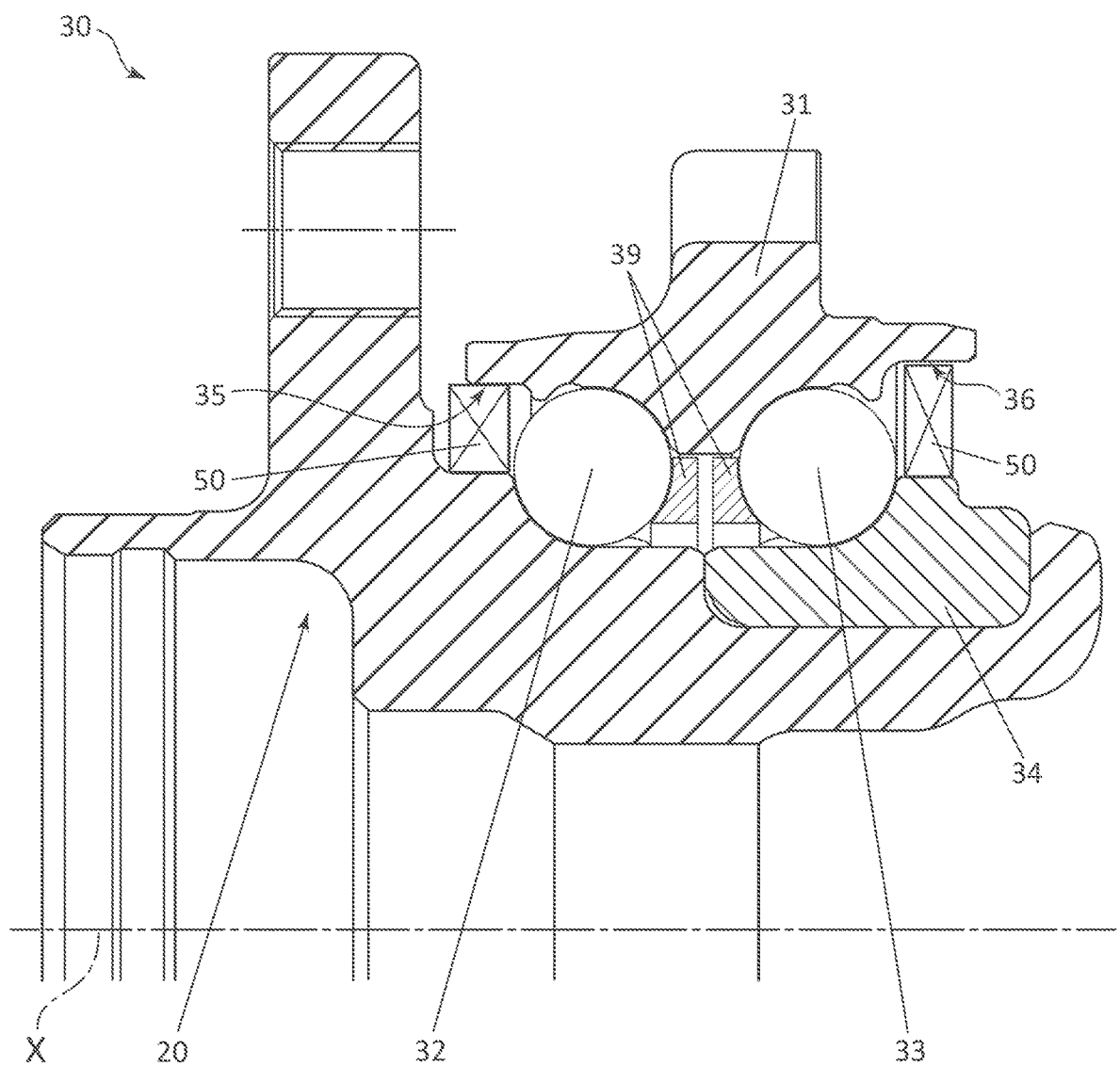
FIG. 1 illustrates a cross-section of a wheel hub assembly provided with a bearing unit according to exemplary embodiments of this disclosure.

Known sealing devices of bearing units consist of two-part cassette seals, comprising a rotating portion mounted on the radially inner ring of the bearing unit and a stationary portion mounted on the radially outer ring of the bearing unit. Still by way of example, the stationary portion comprises a metal screen mounted with interference on the radially outer ring and an elastomer portion that is co-moulded onto the metal screen. A second metal screen is mounted with interference on the rotatable radially inner ring.

According to known sealing devices, the stationary portion of the seal, made of elastomeric material, comprises one or more lips, which make contact with the rotating portion and ensure a sealing action with respect to the interior of the bearing unit.

Also known are sealing devices made of a single piece and integral with one of the rings of the bearing unit, where at least one contact lip ensures the seal owing to the interference with a surface of the other ring of the bearing unit created during assembly of the seal.

Known sealing devices comprise one or more projections, e.g. lips, that make contact with rotating surfaces of the bearing unit. This prevents the entry of contaminants from and protects the internal components of the bearing unit, e.g. one or more rolling bodies and cages containing the rolling bodies. Sealing devices also prevent lubricants present inside the bearing unit from escaping outside.

A sliding frictional force and, consequently, energy dissipation is created between these contact lips and the corresponding rotating contact surfaces of the bearing unit. In general, the sealing capacity increases with the number of contact lips and with their rigidity. At the same time, however, as these parameters increase, the amount of energy dissipation also increases.

As a result of global competition, there is a constant demand for continuous technical or cost-related improvements to wheel hub assemblies. In particular, with the development of technology, demand for components having a low energy dissipation without compromising performance is increasing.

It is therefore necessary to define a sealing device with low energy dissipation, but with an excellent sealing performance that does not have the aforementioned drawbacks.

An object of the present disclosure is to define a cassette sealing device with a first, metallic and rotatable annular screen and a second, metallic and stationary annular screen, on which an annular sealing element is mounted. The annular sealing element is provided with a pair of contacting lips and includes a non-contacting annular lip that forms an additional chamber for draining contaminants from the top towards the bottom of the bearing unit more efficiently. The sealing device is mounted on the radially outer diameter of the radially outer ring so as to create a first labyrinth far from the contacting lips and a larger available volume for draining the contaminant. The further non-contacting annular lip added between the labyrinth and the contacting lips so as to create two chambers for the drainage and the dynamics of the contaminating fluids.

This present solution may be applied to all generations of wheel hub assemblies. In particular, such applications include both the case where the outer ring of the bearing unit is rotatable, while the inner rings of the bearing unit are fixed, and the opposite case where the inner rings rotate and the outer ring is fixed. A sealing device according to this disclosure is also suitable for any type of rolling body (balls, rollers, tapered rollers, etc.).

In the whole of the present disclosure, the terms and expressions indicating positions and orientations, such as "radial" and "axial" are understood as being in relation to a central axis of rotation X of a bearing unit 30. Expressions such as "axially outer" and "axially inner" instead refer to the assembled condition of the wheel hub assembly and, in the case in question, preferably refer to a wheel side and a side opposite to the wheel side, respectively.

Purely by way of non-limiting exemplary embodiments of the present disclosure will now be described with reference to a bearing unit 30.

With reference to FIG. 1, various embodiments of a bearing unit 30 may include a flanged radially inner ring 20, a radially outer ring 31, a radially inner ring 34 mounted on inner ring 20, a plurality of rolling bodies 32, 33, e.g. balls, rollers, etc., interposed between outer ring 31 and flanged inner ring 20, and at least one cage 39 for holding at least one row of rolling bodies 32, 33 in place. In some embodiments, an inner ring 34 may be integral with inner ring 20.

Flanged ring 20 and outer ring 31 may define, together and at axially opposite ends of bearing unit 30, gaps 35, 36. Gaps 35, 36 may allow contaminants and impurities to enter an interior of bearing unit 30.

Therefore, in order to shield bearing unit 30, at least one sealing device 50 may be mounted in at least one of gaps 35, 36.

Known sealing devices may include two metal screens facing each other, at least one of which is provided with one or more sealing lips made of an elastomeric material that is in sliding contact with the other screen. Known sealing device may alternatively include only one metal screen which has one or more sealing lips made of an elastomeric material that makes sliding contact with a sliding surface of a bearing unit in relative movement with respect to the seals.

Figure 2:
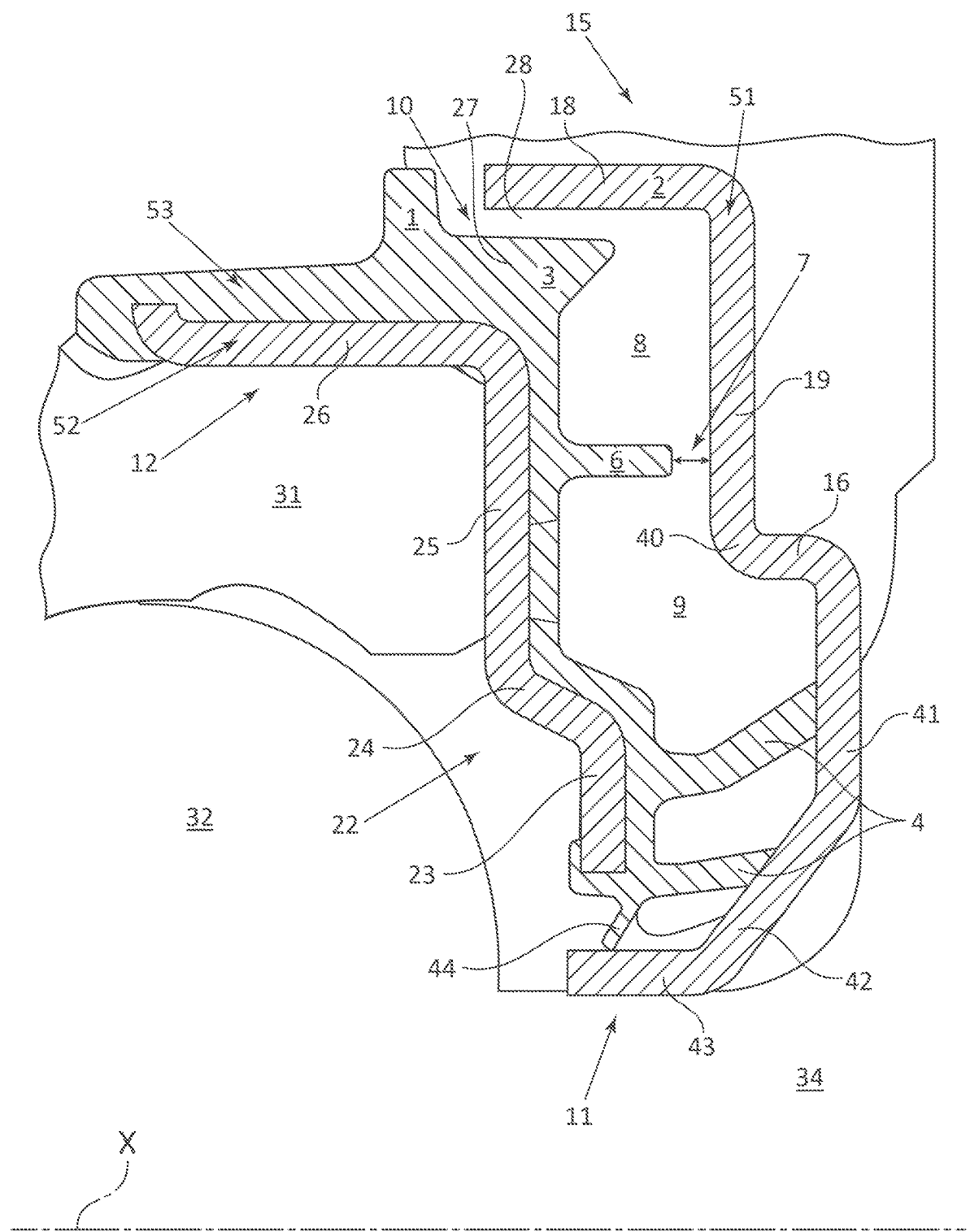
FIG. 2 illustrates a detail view of a sealing device for a bearing unit according to exemplary embodiments of this disclosure.

With reference to FIG. 2, a sealing device 50 may include a first annular screen 51, a second annular screen 52, and an annular sealing element 53 integrally supported by second annular screen 52. In various embodiments, a first annular screen 51 is made of sheet metal so as to be relatively rigid. In various embodiments, a second annular screen 52 is made of sheet metal so as to be relatively rigid. In various embodiments, a sealing element 53 is made of an elastomeric material so as to be elastically deformable.

First annular screen 51 may have a first mounting area 11 for assembly by interference on flanged inner ring 34 and is rotatable during use about an axis of rotation X.

Second annular screen 52 may be coaxial with first screen 51 and may have a second mounting area 12 for assembly by interference on radially outer ring 31. In various embodiments, second annular screen 52 is stationary during use.

Annular sealing element 53 may have a pair of contacting annular sealing lips 4. Both lips 4 may project from mounting portion 12 of second screen 52 towards first screen 51. In various embodiments, lips 4 may project axially at an incline with respect to axis X, and therefore also project radially towards first screen 51. While illustrated in FIG. 2 as a pair of contacting annular sealing lips 4, it should be appreciated that alternative embodiments may include one contacting annular sealing lip 4 or more than two contacting annular sealing lips 4.

In various embodiments, a first annular screen 51 may define a peripheral zone 15 distal to a first mounting area 11. First annular screen 51 may include a first axially extending sleeve portion 16, a second axially extending sleeve portion 18, and a radially extending flange portion 19 connecting sleeve portion 16 and sleeve portion 18. First sleeve portion 16 may be radially closer to the first mounting area 11 than second sleeve portion 18. First flange portion 19 may form with first sleeve portion 16 a step 40 arranged on an inside of first annular screen 51 facing second annular screen 52 and annular sealing element 53. Step 40 may have a connecting radius which is as small as possible to facilitate separation and dripping of contaminants. In various embodiments, a connecting radius of step 40 may be between 0.7 mm and 1.2 mm.

In various embodiments, a second annular screen 52 may define a support zone 22 radially opposite to the second mounting area 12. Second annular screen 52 may include a second flange portion 23 that extends radially towards first mounting area 11 and an intermediate frustoconical portion 24 that connects second flange portion 23 to a second mounting portion 12 and which projects both radially and axially from second mounting portion 12 towards first mounting portion 11. A pair of contacting annular sealing lips 4 may project from first mounting area 11.

In various embodiments, an intermediate portion 24 is partially arranged radially on an inside of a first sleeve portion 16, is directed radially towards the inside, and is positioned axially opposite the step 40 formed by the first flange portion 19 and by the sleeve portion 16. Furthermore, the intermediate portion 24 may be arranged radially (i.e. relative to a radial direction) between the step 40 and the second flange portion 23.

Second mounting area 12 may be arranged radially on an inside of second sleeve portion 18 and may be arranged at least partly inside second sleeve portion 18.

In various embodiments, a second mounting area 12 may include a third flange portion 25, which extends radially from an intermediate portion 24 to a third sleeve portion 26 which extends axially away from third flange portion 25. Third sleeve portion 26 may be arranged radially adjacent to second sleeve portion 18.

A corresponding sleeve portion 27 of annular sealing element 53 may line third sleeve portion 26 on a side facing first annular screen 51 and form with second sleeve portion 18 a radial space 28. Radial space 28 may define an axially directed labyrinth seal between second sleeve portion 18 and third sleeve portion 26. In various embodiments, radial space 28 may have an axial length defined by a portion of second sleeve portion 18 that overlaps axially a portion of third sleeve 26.

In various embodiments, a sleeve portion 27 may include a first, radially projecting annular spur 1 which is located adjacent to radial space 28. Annular spur 1 projects radially from sleeve portion 27 and is arranged adjacent to a terminal edge of second sleeve portion 18 so as to form with it a radially directed labyrinth seal 10. In various embodiments, annular spur 1 may project radially no further than a radially outer face of second sleeve portion 18.

Sleeve portion 27 may further include a frustoconical spur 3 projecting axially from the sleeve portion 27 towards flange portion 19, increasing an axial length of radial gap 28.

In various embodiments, radial space 28 may be arranged radially outside of annular sealing lips 4 so as to protect lips 4 from external contaminants. Annular sealing lips 4 may further be arranged radially between first sleeve portion 16 and first mounting area 11.

In various embodiments, a pair of contacting annular sealing lips 4 slidingly interacts with first annular screen 51. In particular, a first radially outer lip 4 may interact slidingly with a fourth flange portion 41 of first annular screen 51 and a second radially inner lip 4 may interact slidingly with an inclined connection portion 42 of mounting area 11. Inclined connection portion 42 may be inclined relative to an axis of rotation X of bearing unit 30.

In various embodiments, an annular sealing element 53 may be provided with a third sealing lip 44 that interacts in a non-contacting manner with a fourth sleeve portion 43 extending axially from inclined connection portion 42 of first annular screen 51. In various embodiments, fourth sleeve portion 43 may engage by interference with inner ring 34.

In various embodiments, an annular sealing element 53 may be provided with a non-contacting annular lip 6 extending axially towards first flange portion 19. Non-contacting annular lip 6 may be provided radially between radial space 28 and annular sealing lips 4. Annular lip 9 and first flange portion 19 define between one another a gap 7. Contaminants will be forced to pass through gap 7 into which a rotating metallic part of first flange portion 19 conveys it as a result of adhesion of a limit layer of contaminant. Gap 7 may therefore act as a barrier to a flow of contaminants, reducing a quantity of contaminant at annular sealing lips 4. This allows annular sealing lips 4 to operate in a less severe environment, improving their operating life.

A sealing device 50 according to the present disclosure may include a first, radially directed labyrinth seal 10 between a first annular spur 1 and an axial face of a second sleeve portion 18. It should be noted that a radially outer diameter of spur 1 may be smaller than the radially outer diameter of the second sleeve portion 18. In this way, contaminants that may enter into labyrinth seal 10 may be drained more efficiently during operating conditions of a bearing unit 30, due to rotation of a flange portion 19.

Sealing device 50 may further include a second, axially directed labyrinth seal 28 between sleeve portion 27 and second sleeve portion 18, the efficiency of which is improved by the presence of an axially projecting, frustoconical spur 3 that increases the axial length of labyrinth seal 28. In this way, an improved sealing/friction ratio is achieved. Labyrinth seal 28 is less subject to directly receive external contaminants because it is axially extending, Moreover, the functionality of labyrinth seal 28 is significantly improved by the presence of first spur 1 and by the formation of a peripheral zone of the first annular screen 51, which acts as deviator for the external contaminants.

Sealing device 50 may further include a first drainage chamber 8 defined between frustoconical spur 3, non-contacting annular lip 6, and first flange portion 19 of first annular screen 51. Drainage chamber 8 may create turbulence in contaminants and force them to pass into a gap 7 where contaminants may be drained by first rotating flange portion 19. A second drainage chamber 9 may be limited by non-contacting annular lip 6 and by a first radially outer lip of a pair of contacting annular sealing lips 4. Only a limited quantity of contaminant may pass through narrow section 7 and arrives inside second drainage chamber 9.

In addition to the embodiments described herein, it must be understood that there exist numerous other variants. It must also be understood that these embodiments are only examples and do not limit either the scope of the disclosure, nor its applications, nor its possible configurations. On the contrary, although the description above allows the person skilled in the art to implement the present disclosure at least according to one of its examples of embodiment, it must be understood that many variants of the components described are possible, without thereby departing from the scope of the disclosure interpreted literally and/or in accordance with their legal equivalents.

I claim:

1. A sealing device for a bearing unit, the bearing unit comprising a radially outer ring and a radially inner ring, the sealing device comprising:
    a first metallic, annular screen comprising a first mounting area, the first mounting area configured to contact by interference the radially inner ring in an assembled configuration, wherein the first annular screen comprises:
        an inclined connection portion configured to be inclined axially with respect to an axis of rotation of the bearing unit in an assembled configuration; and
    a first flange portion extending radially from the inclined connection portion;
    a second metallic, stationary annular screen comprising a second mounting area, the second mounting area configured to contact by interference the radially outer ring in the assembled configuration;
    an annular sealing element made of elastomeric material and integrally supported by the second annular screen, the annular sealing element comprising:
    a first contacting annular sealing lip projecting from the second annular screen towards the first screen, wherein the first contacting sealing lip interacts slidingly with the first flange portion of the first annular screen; and
    a second contacting annular sealing lip projecting from the second annular screen towards the first screen, wherein the second contacting sealing lip interacts slidingly with the inclined connecting portion of the first annular screen; and
    a non-contacting annular lip extending axially towards the first flange portion of the first annular screen,
    wherein, the non-contacting annular lip is disposed radially between a labyrinth seal at an external end of the sealing device and the at least one contacting annular sealing lip at an internal end of the sealing device,
    the non-contacting annular lip and the first flange of the first annular screen define between them a gap comprising an axial width of less than 1.3 mm, and
    the first flange portion and the first sleeve portion of the first annular screen form a step positioned radially inside the first annular screen and facing axially the second annular screen and the annular sealing element, wherein the step comprising a connecting radius of between 0.7 mm and 1.2 mm.

2. The sealing device according to claim 1, wherein,
    the annular sealing element further comprises a sleeve portion comprising an axially projecting frustoconical spur,
    the first annular screen further comprises a first sleeve portion, and
    the sleeve portion of the annular sealing element and the first sleeve portion of the first annular screen form together the labyrinth seal.

3. The sealing device according to claim 2, wherein a first drainage chamber is defined between the frustoconical spur, the non-contacting annular lip, and the first flange portion of the first annular screen.

4. The sealing device according to claim 3, wherein a second drainage chamber is defined between the non-contacting annular lip and the at least one contacting annular sealing lip.

5. The sealing device according to claim 1, wherein the first flange portion forms with a second sleeve portion of the first annular screen a step arranged radially on an inside of the first annular screen and arranged axially facing the second annular screen and the annular sealing element, wherein a connecting radius of the step is between 0.7 mm and 1.2 mm.

6. The sealing device according to claim 5, wherein the annular sealing element is provided with a third sealing lip extending towards a third sleeve portion of the first annular screen, the third sleeve portion extending axially away from the inclined connection portion towards the second annular screen.

7. The sealing device according to claim 6, wherein the radially outer ring is stationary and the radially inner ring is rotatable.

8. The sealing device according to claim 6, wherein the radially outer ring is rotatable and the radially inner ring is stationary.

9. A bearing unit, comprising:
    a first flanged, rotatable radially inner ring;
    a stationary radially outer ring;
    a second rotatable radially inner ring mounted on and integral with the radially inner flanged ring;
    a plurality of rolling bodies interposed between the radially outer ring and the radially inner rings; and
    a sealing device comprising:
        a first metallic, annular screen comprising a first mounting area, the first mounting area contacting by interference the radially inner ring in an assembled configuration, wherein the first annular screen comprises:
            an inclined connection portion configured to be inclined axially with respect to an axis of rotation of the bearing unit in an assembled configuration; and
            a first flange portion extending radially from the inclined connection portion;
        a second metallic, stationary annular screen comprising a second mounting area, the second mounting area contacting by interference the radially outer ring in an assembled configuration;

an annular sealing element made of elastomeric material and integrally supported by the second annular screen, the annular sealing element comprising:
a first contacting annular sealing lip projecting from the second annular screen towards the first screen, wherein the first contacting sealing lip interacts slidingly with the first flange portion of the first annular screen; and
a second contacting annular sealing lip projecting from the second annular screen towards the first screen, wherein the second contacting sealing lip interacts slidingly with the inclined connecting portion of the first annular screen; and
a non-contacting annular lip extending axially towards the first flange portion of the first annular screen,
wherein, the non-contacting annular lip is disposed radially between a labyrinth seal at an external end of the sealing device and the at least one contacting annular sealing lip at an internal end of the sealing device,
the non-contacting annular lip and the first flange of the first annular screen define between them a gap comprising an axial width of less than 1.3 mm, and
the first flange portion and the first sleeve portion of the first annular screen form a step positioned radially inside the first annular screen and facing axially the second annular screen and the annular sealing element, wherein the step comprising a connecting radius of between 0.7 mm and 1.2 mm.

10. The bearing unit according to claim 9, wherein the annular sealing element is provided with a third sealing lip extending towards a fourth sleeve portion of the first annular screen, the forth sleeve portion extending axially away from the inclined connection portion towards the second annular screen.

11. A sealing device, for a bearing unit, the bearing unit comprising a stationary radially outer ring and a rotatable radially inner ring, the sealing device comprising:
a first metallic, annular screen comprising a first mounting area, the first mounting area configured to contact by interference the radially inner ring in an assembled configuration;
a second metallic, stationary annular screen comprising a second mounting area, the second mounting area configured to contact by interference the radially outer ring in the assembled configuration;
an annular sealing element made of elastomeric material and integrally supported by the second annular screen, the annular sealing element comprising at least one contacting annular sealing lip projecting from the second screen towards the first screen; and
a non-contacting annular lip extending axially towards a first flange portion of the first annular screen, wherein,
the non-contacting annular lip is disposed radially between a labyrinth seal at an external end of the sealing device and the at least one contacting annular sealing lip at an internal end of the sealing device, and
the non-contacting annular lip and the first flange portion of the first annular screen define a gap between thereto, the gap has an axial dimension of less than 1.3 mm, and
the annular sealing element further comprises a sleeve portion comprising an axially projecting frustoconical spur, and
the first annular screen further comprises a sleeve portion, the sleeve portion of the annular sealing element and the sleeve portion of the first annular screen form together the labyrinth seal, and
between the frustoconical spur, the non-contacting annular lip, and the first flange portion of the first annular screen a first drainage chamber is defined, and
between the non-contacting annular lip and the at least one contacting annular sealing lip a second drainage chamber is defined, and
the first flange portion forms with a first sleeve portion of the first annular screen a step arranged radially on an inside of the first annular screen and arranged axially facing the second annular screen and the annular sealing element, wherein a connecting radius of the step is between 0.7 mm and 1.2 mm, and
the at least one annular sealing lip is a pair of annular sealing lips and wherein a first radially outer lip interacts slidingly with a fourth flange portion of the first annular screen and a second radially inner lip of the pair of annular sealing lips interacts slidingly with an inclined connecting portion of the first mounting area, the inclined connection portion being inclined axially with respect to an axis of rotation of the bearing unit, and
the annular sealing element is provided with a third sealing lip extending towards a fourth sleeve portion of the first annular screen, the fourth sleeve portion extending axially away from the inclined connection portion towards the second annular screen.

* * * * *